(12) United States Patent
Szaikowski

(10) Patent No.: US 8,237,068 B2
(45) Date of Patent: Aug. 7, 2012

(54) PROJECTED CAPACITIVE TOUCH-SENSITIVE PANEL

(75) Inventor: Daniel Szaikowski, Dacula, GA (US)

(73) Assignee: OpeanPeak Inc., Boca Raton, FL (US)

( * ) Notice: Subject to any disclaimer, the term of this patent is extended or adjusted under 35 U.S.C. 154(b) by 461 days.

(21) Appl. No.: 12/537,774

(22) Filed: Aug. 7, 2009

(65) Prior Publication Data
US 2011/0032193 A1 Feb. 10, 2011

(51) Int. Cl.
G06F 3/044 (2006.01)
G06F 3/045 (2006.01)
G08C 21/00 (2006.01)
(52) U.S. Cl. .................. 178/18.08; 178/18.06; 345/174
(58) Field of Classification Search .......... 345/173–183; 178/19.03–19.07, 20.01–20.04, 18.08
See application file for complete search history.

(56) References Cited

U.S. PATENT DOCUMENTS

| | | | | |
|---|---|---|---|---|
| 4,686,332 A | * | 8/1987 | Greanias et al. | 345/173 |
| 4,853,497 A | * | 8/1989 | Landmeier | 178/18.08 |
| 5,218,173 A | * | 6/1993 | Garwin et al. | 178/18.08 |
| 5,357,061 A | * | 10/1994 | Crutchfield | 178/18.08 |
| 7,202,855 B2 | | 4/2007 | Shigetaka et al. | |
| 2004/0183787 A1 | | 9/2004 | Geaghan et al. | |
| 2007/0236618 A1 | | 10/2007 | Maag et al. | |
| 2008/0062148 A1 | | 3/2008 | Hotelling | |
| 2008/0266273 A1 | | 10/2008 | Slobodin et al. | |
| 2008/0309633 A1 | * | 12/2008 | Hotelling et al. | 345/173 |
| 2009/0159344 A1 | | 6/2009 | Hotelling | |

FOREIGN PATENT DOCUMENTS

WO 2011017511 A1 2/2011

OTHER PUBLICATIONS

International Search Report and Written Opinion received for PCT Patent Application No. PCT/US10/044536, mailed on Sep. 29, 2010, 13 pages.

* cited by examiner

*Primary Examiner* — Kevin M Nguyen
(74) *Attorney, Agent, or Firm* — Fiala & Weaver P.L.L.C.

(57) ABSTRACT

A touch-sensitive panel is described herein that includes a first sensor layer and a second sensor layer and at least one shield electrode integrated into the first sensor layer and/or the second sensor layer. The at least one shield electrode is operable to cancel parasitic capacitance between at least one sense electrode in the first sensor layer and at least one sense electrode in the second sensor layer. The integrated shield electrode(s) in the first sensor layer and/or the second sensor layer can be used in place of an additional shield layer to combat parasitic capacitance in the touch-sensitive panel, thereby reducing the cost and materials necessary to manufacture the touch-sensitive panel. A touch-screen display that includes such a touch-sensitive panel and a method of operating such a touch-sensitive panel are also described.

32 Claims, 9 Drawing Sheets

PROJECTED CAPACITIVE TOUCH-SENSITIVE PANEL

BACKGROUND OF THE INVENTION

1. Field of the Invention

The present invention generally relates to touch-sensitive panels used to implement touch-screen displays. In particular, the present invention relates to touch-sensitive panels that utilize projected capacitive technology to perform touch-sensing functions.

2. Background

Touch-screen displays provide an easy and intuitive interface by which users can control and interact with applications executing on a computer or other electronic device. For example, a touch-screen display may enable a user to select an object or move a cursor rendered to the display by simply touching the display with a finger, stylus or other object. By integrating user input functionality into the display, touch-screen displays enable electronic devices to be operated without a separate input device such as a keyboard, mouse, pointing stick, or touch pad. For at least this reason, touch-screen displays are becoming increasingly popular interfaces for portable and handheld electronic devices, including but not limited to personal digital assistants (PDAs), mobile telephones, and personal media players, in which compactness and ease of use is important. The increased popularity of touch-screen displays may also be attributed to advances in touch-sensing technology that have resulted in both improved performance and reduced cost.

Certain conventional touch-screen displays include a substantially transparent touch-sensitive panel and a controller connected thereto. The touch-sensitive panel is positioned in front of a display, such as a Liquid Crystal Display (LCD) or other type of display, so that the touch-sensitive panel covers the viewable area of the display. The touch-sensitive panel is designed such that it registers a change of state responsive to the touch or proximity of an object such as a finger or stylus. The controller senses the change of state and generates data associated with a touch event responsive thereto. The controller passes the data concerning the touch event to a host processing system which interprets the data as a form of user input.

Various types of technology exist for implementing touch-sensitive panels. These types of technology include resistive, capacitive, infrared, surface acoustic wave, electromagnetic and near field imaging. In a capacitive touch-sensitive panel, an electrostatic field is established around one or more capacitive nodes integrated within the touch-sensitive panel. The proximity or touch of an object, such as an object or stylus, disturbs the electrostatic field around the node(s) in a manner that can be sensed and measured by the controller. Projected capacitive touch-sensitive panels are panels in which the electrostatic field is projected above the surface of the panel, such that the user may not be required to physically touch the touch-screen display in order for a touch to be registered. This provides improved sensitivity and reduced wear and tear on the touch-screen display.

In one type of projected capacitive touch-sensitive panel, the capacitive nodes comprise electrodes formed from a transparent resistive material such as indium tin oxide (ITO). FIG. 1 depicts an example of such a touch-sensitive panel 100, shown using an exploded view. As illustrated in FIG. 1, the capacitive nodes include a series of substantially parallel electrodes $112_1$-$112_{12}$ extending in a first direction and a series of substantially parallel electrodes $122_1$-$122_{20}$ extending in a second direction, wherein the second direction is substantially orthogonal with respect to the first direction. Each set of electrodes $112_1$-$112_{12}$ and $122_1$-$122_{20}$ is formed on a corresponding transparent substrate 116 and 126, each of which may comprise for example a polyethylene terephthalate (PET) film or glass. Each set of electrodes $112_1$-$112_{12}$ and $122_1$-$122_{20}$ is connected to a controller via a corresponding set of conductive traces $114_1$-$114_{12}$ and $124_1$-$124_{20}$, which may be implemented for example using metal or silver ink. The controller charges each electrode via a corresponding trace, thereby causing an electrostatic field to be projected around the electrode. When a user disturbs the electrostatic field around a particular electrode, the disturbance is sensed by the controller via the trace connected to the electrode.

Taken together, electrodes $112_1$-$112_{12}$, conductive traces $114_1$-$114_{12}$, and substrate 116 form a first sensor layer 102 of touch-screen panel 100 that is capable of detecting touches in one direction, which may arbitrarily be termed the Y direction. Similarly, taken together, electrodes $122_1$-$122_{20}$, conductive traces $124_1$-$124_{20}$, and substrate 126 form a second sensor layer 104 of touch-screen panel 100 that is capable of detecting touches in another direction, which may arbitrarily be called the X direction. First sensor layer 102 and second sensor layer 104 are typically laminated together via an intermediate adhesive layer (not shown in FIG. 1) that may also serve to isolate the electrodes of first sensor layer 102 from the electrodes of second sensor layer 104 in an implementation in which the electrodes of one layer are facing the electrodes of the other.

Each electrode of first sensor layer 102 and second sensor layer 104 includes a series of substantially diamond-shaped segments connected by smaller substantially rectangular-shaped segments. When first sensor layer 102 and second sensor layer 104 are properly aligned, the overlap between the substantially diamond-shaped segments of the electrodes of first sensor layer 102 and the substantially diamond-shaped segments of the electrodes of second sensor layer 104 is minimized. This is illustrated in FIG. 2, which depicts a partial blown-up view 200 of touch-sensitive panel 100. This arrangement helps to maximize exposure of each electrode to the surface of touch-sensitive panel 100 while also helping to reduce capacitive coupling between the substantially diamond-shaped segments on the different sensor layers. However, as shown in FIG. 2, the substantially rectangular-shaped portions of the electrodes of first sensor layer 102 and second sensor layer 104 do overlap. Consequently, when there is a voltage differential between an electrode on first sensor layer 102 and an electrode on second sensor layer 102 (e.g., when an electrode on first sensor layer 102 is charged and an electrode on second sensor layer 104 is grounded, or vice versa), parasitic capacitance can form between the overlapping substantially rectangular portions of each electrode. This parasitic capacitance can interfere with proper performance of touch-sensitive panel 100. For example, such parasitic capacitance may cause the controller portion of touch-sensitive panel 100 to interpret an actual touch event as noise or vice versa.

To address this issue, conventional touch-sensitive panel 100 includes an additional layer 106 that is typically laminated to the bottom of second sensor layer 104 and comprises a flat sheet 132 of resistive material such as ITO formed on a substrate 136. In an alternative implementation, flat sheet 132 may be formed on the back of substrate 126 of second sensor layer 104. The flat sheet 132 is also connected to the controller via at least one conductive trace (not shown in FIG. 1). During operation of touch-sensitive panel 100, the controller applies a current to flat sheet 132 in a manner that tends to cancel parasitic capacitance that might develop between overlapping electrodes on first sensor layer 102 and second sensor layer 104. Layer 106 may be referred to in the art as a shield layer. The requirement of including layer 106 to combat parasitic capacitance increases the amount of material required to manufacture touch-sensitive panel 100 as well as the cost.

Another potential problem with the touch-sensitive panel design depicted in FIG. 1 is that internal reflections may occur when light strikes the electrodes on first sensor layer 102 and second sensor layer 104. Such reflections can occur, for example, when ITO used to form the electrodes has a refractive index that is different than an adhesive layer that is used to join first sensor layer 102 to second sensor layer 104. The reflections can make the patterned ITO visible to a user, which is highly undesirable. To address this issue, a particular type of ITO termed index-matched ITO may be used to form the electrodes. The use of such index-matched ITO serves to reduce internal reflections. However, index-matched ITO is typically more expensive than non-index-matched ITO. Furthermore, index-matched ITO is typically only available in a form that has a higher resistance relative to certain other forms of non-index-matched ITO. The use of such relatively high-resistance ITO may require more charge to be used to drive the electrodes of touch sensitive panel 100 and/or may result in reduced sensitivity along portions of the electrodes.

What is needed then is a touch-sensitive panel, such as a projected capacitive touch sensitive panel, for use in a touch-screen display that addresses one or more of the foregoing issues associated with conventional touch-sensitive panels.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A touch-sensitive panel is described herein that includes a first sensor layer and a second sensor layer and at least one shield electrode integrated into the first sensor layer and/or the second sensor layer. The at least one shield electrode is operable to cancel parasitic capacitance between at least one sense electrode in the first sensor layer and at least one sense electrode in the second sensor layer. The integrated shield electrode(s) in the first sensor layer and/or the second sensor layer can be used in place of an additional shield layer to combat parasitic capacitance in the touch-sensitive panel, thereby reducing the cost and materials necessary to manufacture the touch-sensitive panel. Alternatively, the integrated shield electrode(s) may be used along with a separate shield layer in the touch-sensitive panel to provide an additional level of protection against parasitic capacitance. A touch-screen display that includes such a touch-sensitive panel and a method of operating such a touch-sensitive panel are also described herein.

In one implementation, a plurality of shield electrodes and sense electrodes of the touch-sensitive panel are implemented using the same substantially transparent resistive material and are implemented in the first and/or second sensor layers in such a manner that gaps between the sense electrodes are largely filled by the shield electrodes. If the gaps between the sense electrodes and the shield electrodes are sufficiently small, internal reflections that normally arise due to a difference between the refractive indices of the material used to form the sense electrodes and an adhesive layer that is used to join the first sensor layer to the second sensor layer can be reduced. As a result, a material such as non-index-matched indium tin oxide (ITO) may be used to implement the sense electrodes and shield electrodes while still maintaining an acceptable level of panel transparency. Such non-index-matched ITO can be less expensive and provide a lower resistance than index-matched ITO that is conventionally used to minimize internal reflections.

In particular, a touch-sensitive panel is described herein. The touch-sensitive panel includes a first sensor layer and a second sensor layer. The first sensor layer includes a first plurality of sense electrodes that are disposed upon and extend in a first direction across a first substrate surface. The second sensor layer includes a second plurality of sense electrodes that are disposed upon and extend in a second direction across a second substrate surface and at least one shield electrode disposed on the second substrate surface. Each sense electrode is operable to generate an electrostatic field used in sensing touch events. The at least one shield electrode is operable to cancel parasitic capacitance between at least one sense electrode in the first plurality of sense electrodes and at least one sense electrode in the second plurality of sense electrodes.

In one implementation of the touch-sensitive panel, the second sensor layer comprises a plurality of shield electrodes disposed on the second substrate surface. Each of the plurality of shield electrodes is disposed between and extends in a substantially parallel manner to a unique pair of the second plurality of sense electrodes. Each of the second plurality of sense electrodes and the plurality of shield electrodes may comprise a series of substantially diamond-shaped segments connected together by smaller substantially rectangular-shaped segments.

In a further implementation of the touch-sensitive panel, the first sensor layer further comprises at least one shield electrode that is disposed on the first substrate surface and that is operable to cancel parasitic capacitance between at least one sense electrode in the first plurality of sense electrodes and at least one sense electrode in the second plurality of sense electrodes.

Depending upon the implementation of the touch-sensitive panel, the first substrate surface and the second substrate surface may comprise surfaces of different substrates or may comprise opposite surfaces of a single substrate. Also depending upon the implementation, the first substrate surface and the second substrate surface may each comprise a surface of a substantially transparent glass substrate or a surface of a substantially transparent polyester film.

In yet another implementation of the touch-sensitive panel, the first plurality of sense electrodes, the second plurality of sense electrodes, and the at least one shield electrode are each formed from a substantially transparent resistive material. Such substantially transparent resistive material may comprise, for example, ITO and, in certain implementations, non-index-matched ITO.

An alternative touch-sensitive panel is described herein. The alternative touch-sensitive panel includes a first plurality of sense electrodes, a second plurality of sense electrodes and at least one shield electrode. The first plurality of sense electrodes are formed from a first layer of substantially transparent resistive material and extend in a first direction. The second plurality of sense electrodes and the at least one shield electrode are formed from a second layer of substantially transparent resistive material and extend in a second direction. Each sense electrode is operable to generate an electrostatic field used in sensing touch events. The at least one shield electrode is operable to cancel parasitic capacitance between at least one sense electrode in the first plurality of sense electrodes and at least one sense electrode in the second plurality of sense electrodes.

A touch-screen display is also described herein. The touch-screen display includes a touch-sensitive panel and a controller. The touch-sensitive panel includes a first sensor layer and a second sensor layer. The first sensor layer includes a first plurality of sense electrodes that are disposed upon and extend in a first direction across a first substrate surface. The second sensor layer includes a second plurality of sense electrodes that are disposed upon and extend in a second direction across a second substrate surface and at least one shield electrode disposed on the second substrate surface. The controller is connected to the first plurality of sense electrodes, the second plurality of sense electrodes and the at least one shield electrode. The controller is configured to charge the first and second plurality of sense electrodes to generate an electrostatic field around each sense electrode for use in sensing touch events and to charge the at least one shield electrode in a manner that cancels parasitic capacitance between at least one of the first plurality of sense electrodes and at least one of the second plurality of sense electrodes.

A method for operating a touch-sensitive panel is also described herein. In accordance with the method, a first plurality of sense electrodes disposed upon and extending in a first direction across a first substrate surface are charged to generate an electrostatic field around each of the first plurality of sense electrodes for use in sensing touch events. A second plurality of sense electrodes disposed upon and extending in a second direction across a second substrate surface are charged to generate an electrostatic field around each of the second plurality of sense electrodes for use in sensing the touch events. At least one shield electrode disposed upon the second substrate surface is charged in a manner that cancels parasitic capacitance between at least one of the first plurality of sense electrodes and at least one of the second plurality of sense electrodes.

An alternative touch-screen display is also described herein. The alternative touch-screen display includes a touch-sensitive panel and a controller. The touch-sensitive panel includes a first plurality of sense electrodes, a second plurality of sense electrodes, and at least one shield electrode. The first plurality of sense electrodes are formed from a first layer of substantially transparent resistive material and extend in a first direction. The second plurality of sense electrodes and the at least one shield electrode are formed from a second layer of substantially transparent resistive material and extend in a second direction. The controller is connected to the first plurality of sense electrodes, the second plurality of sense electrodes and the at least one shield electrode. The controller is configured to charge the first and second plurality of sense electrodes to generate an electrostatic field around each sense electrode for use in sensing touch events and to charge the at least one shield electrode in a manner that cancels parasitic capacitance between at least one of the first plurality of sense electrodes and at least one of the second plurality of sense electrodes.

An alternative method for operating a touch-sensitive panel is also described herein. In accordance with the alternative method, a first plurality of sense electrodes that are formed from a first layer of substantially transparent resistive material and that extend in a first direction are charged to generate an electrostatic field around each of the first plurality of sense electrodes for use in sensing touch events. A second plurality of sense electrodes that are formed from a second layer of substantially transparent resistive material and that extend in a second direction are charged to generate an electrostatic field around each of the second plurality of sense electrodes for use in sensing the touch events. At least one shield electrode formed from the second layer of substantially transparent resistive material is charged in a manner that cancels parasitic capacitance between at least one of the first plurality of sense electrodes and at least one of the second plurality of sense electrodes.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
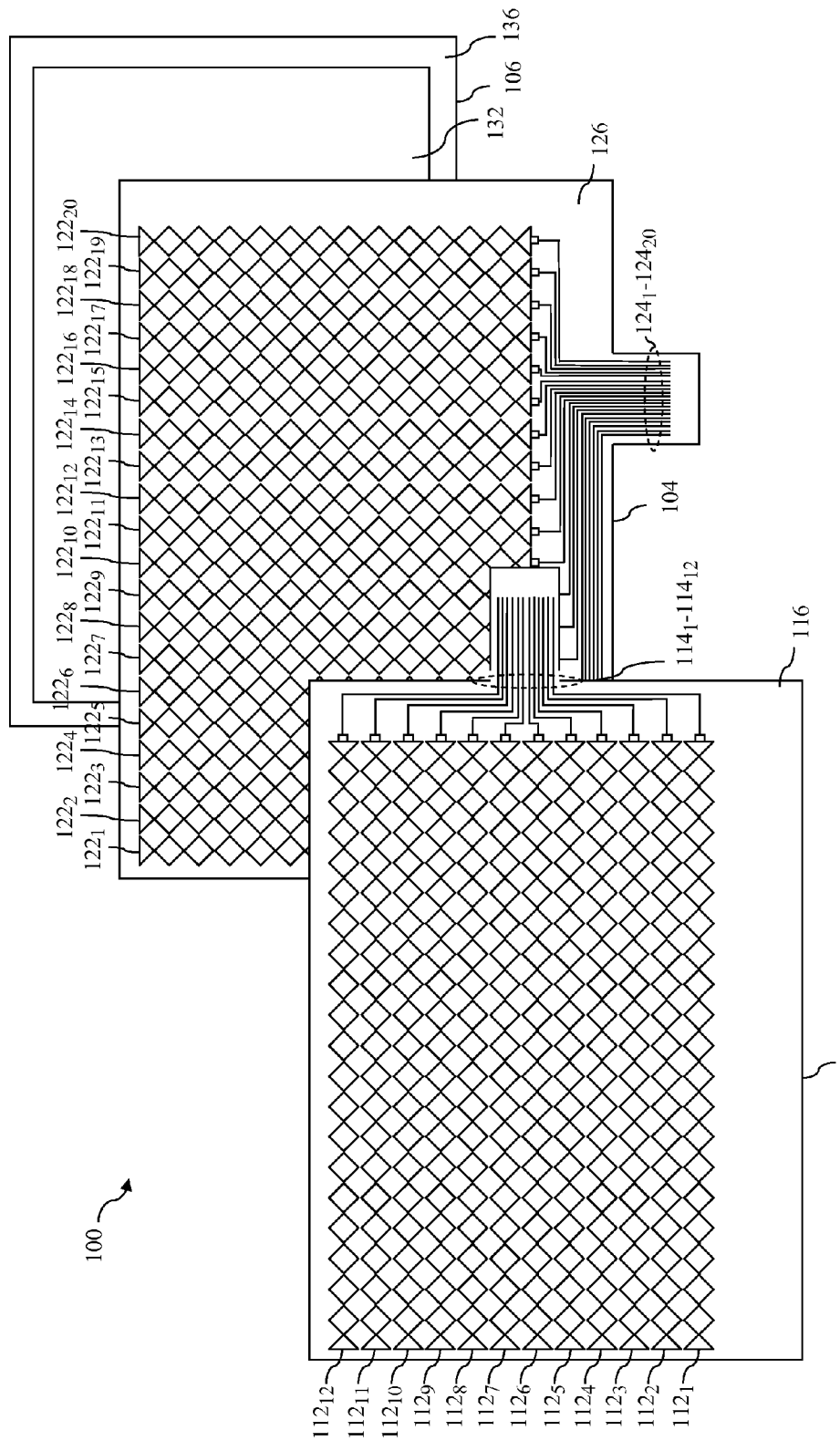
FIG. 1 is an exploded view of a conventional projected capacitive touch-sensitive panel.
Figure 2:
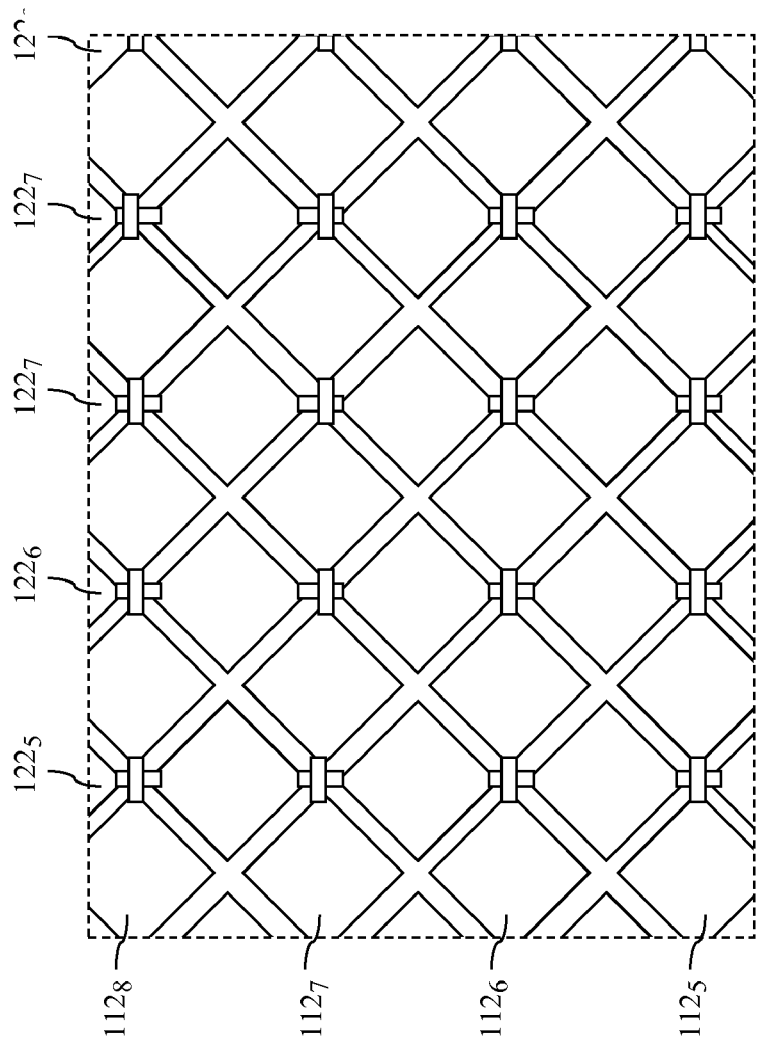
FIG. 2 is a partial blown-up view of the conventional projected capacitive touch-sensitive panel of FIG. 1.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

B. Example Operating Environment

Figure 3:
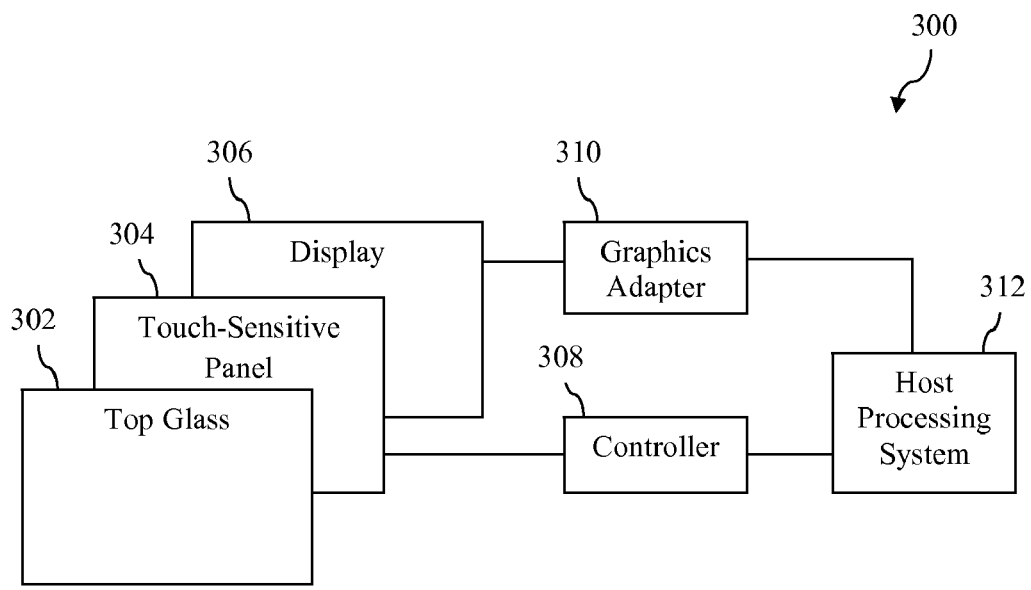
FIG. 3 is a block diagram of a system in which a touch-sensitive panel in accordance with an embodiment of the present invention may be implemented.

FIG. 3 is a block diagram of an example system 300 in which a touch-sensitive panel in accordance with an embodiment of the present invention may be implemented. System 300 may comprise any system that utilizes a touch-screen display, including but not limited to, certain personal computer systems, ATM machines, retail point-of-sale terminals, car navigation systems, medical monitors, industrial control systems, and consumer electronic devices. In an embodiment in which system 300 represents a consumer electronic device, the consumer electronic device may comprise, for example and without limitation, a personal digital assistant (PDA), mobile telephone, smart telephone, personal e-mail device, personal media player, or telephony and digital media services device such as that described in pending U.S. Provisional Patent Application No. 61/139,090 to Krzyzanowski et al.

As shown in FIG. 3, system 300 includes a host processing system 312 that is communicatively connected to a display 306 via a graphics adapter 310. Graphics adapter 310 operates in a well-known manner to receive commands from host processing system 312 and to render graphic content to display 306 responsive to the processing of such commands. Display 306 may comprise a liquid crystal display (LCD), plasma display, or other type of display.

As further shown in FIG. 3, a substantially transparent touch-sensitive panel 304 in accordance with an embodiment of the present invention is positioned on top of display 306. Touch-sensitive panel 304 may be positioned such that it covers the entire viewable area of display 306. A substantially transparent top glass 302 is positioned on top of touch-sensitive panel 304. An adhesive layer or other means may be used to secure touch-sensitive panel 304 to display 306 and/or to secure top glass 302 to touch-sensitive panel 304. Top glass 302 protects underlying touch-sensitive panel 304 and provides a durable surface that a user may touch with a finger, stylus or other object. Because top glass 302 and touch-sensitive panel 304 are substantially transparent, a user of system 300 can view graphics content rendered to display 306 through those components.

Touch-sensitive panel 304 is communicatively connected to a controller 308, which is in turn communicatively connected to host processing system 312. As will be described in more detail herein, touch-sensitive panel 304 comprises a plurality of sense electrodes formed on one or more substrates. Controller 308 is configured to charge each of the plurality of sense electrodes, thereby causing a corresponding electrostatic field to be created around each sense electrode. When a user presses an object, such as a finger or stylus, against top glass 302 or brings such an object within close proximity of top glass 302, capacitive coupling between the object and one or more of the sense electrodes causes the electrostatic field(s) around the one or more electrodes to be disturbed. Controller 308 senses the disturbance and generates data associated with a touch event responsive thereto. Controller 308 passes the data concerning the touch event to host processing system 312 which interprets the data as a form of user input.

It is noted that system 300 has been presented herein by way of example only. Persons skilled in the relevant art(s) will appreciate that a touch-sensitive panel in accordance with the present invention can be used in a variety of systems other than that depicted in FIG. 3.

Figure 4:
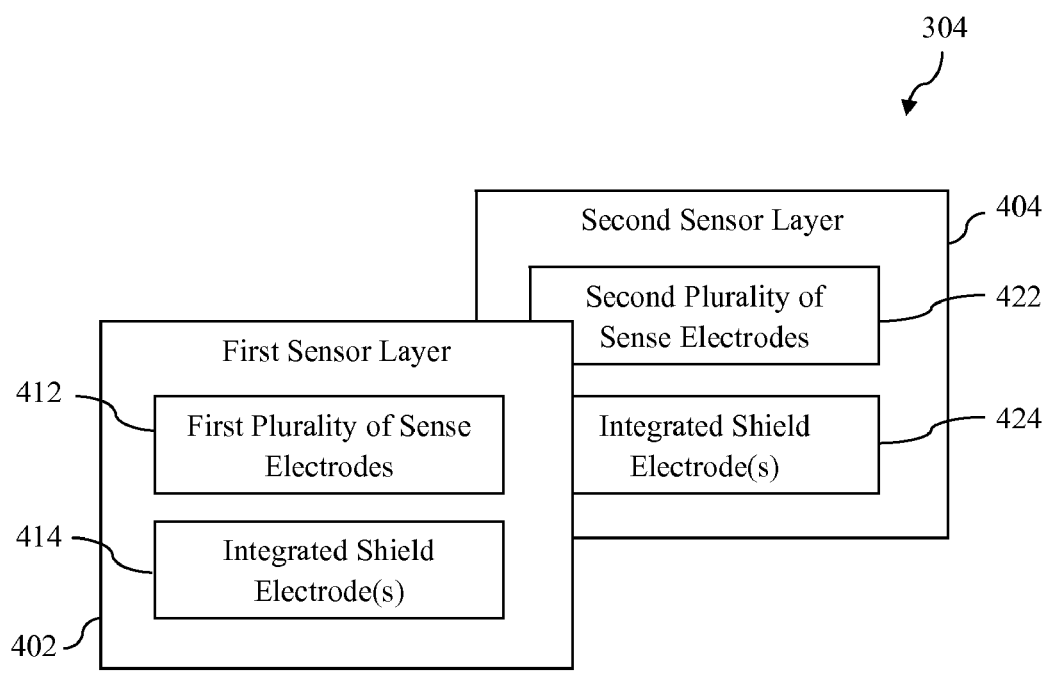
FIG. 4 is a block diagram of a touch-sensitive panel in accordance with an embodiment of the present invention.

C. Example Touch-Sensitive Panel in Accordance with an Embodiment of the Present Invention FIG. 4 is a block diagram that shows touch-sensitive panel 304 of FIG. 3 in more detail. As shown in FIG. 4, touch-sensitive panel 314 comprises a first sensor layer 402 and a second sensor layer 404. First sensor layer 402 is disposed on top of second sensor layer 404 and affixed thereto in a manner to be described in more detail herein. First sensor layer 402 includes a first plurality of sense electrodes 412 operable to detect touch events in one direction and at least one integrated shield electrode 414. Second sensor layer 404 includes a second plurality of sense electrodes 414 operable to detect touch events in another direction and at least one integrated shield electrode 424. The at least one shield electrode included in each sensor layer is operable to cancel parasitic capacitance between at least one sense electrode in first sensor layer 402 and at least one sense electrode in second sensor layer 404. The integrated shield electrode(s) in first sensor layer 402 and/or second sensor layer 404 can advantageously be used in place of an additional shield layer to combat parasitic capacitance in touch-sensitive panel 304, thereby reducing the cost and materials necessary to manufacture touch-sensitive panel 304. Alternatively, the integrated shield electrode(s) may be used along with a separate shield layer in touch-sensitive panel 304 to provide an additional level of protection against parasitic capacitance.

Figure 5:
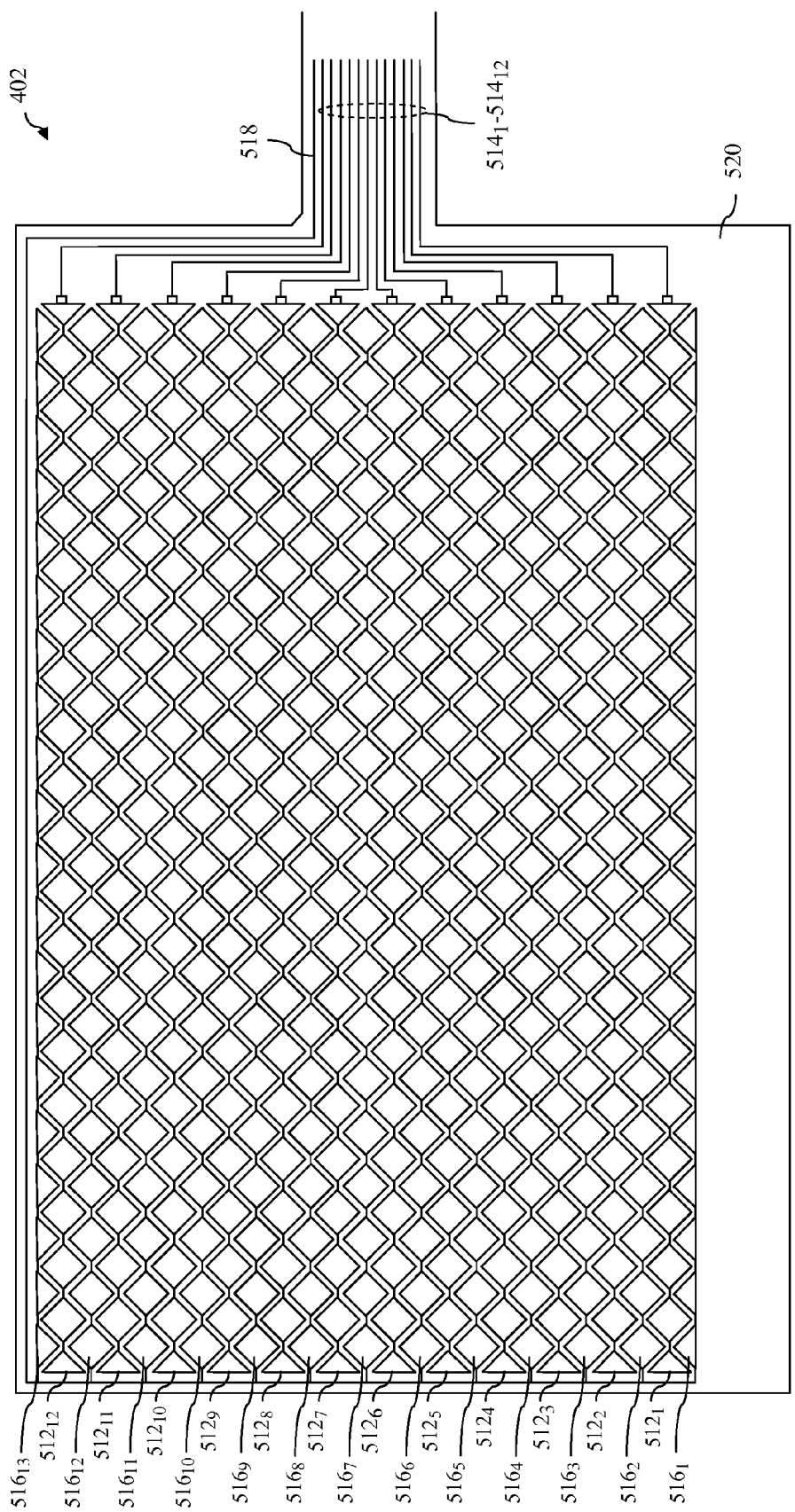
FIG. 5 is a top view of a first sensor layer of a touch-sensitive panel in accordance with an embodiment of the present invention.
Figure 6:
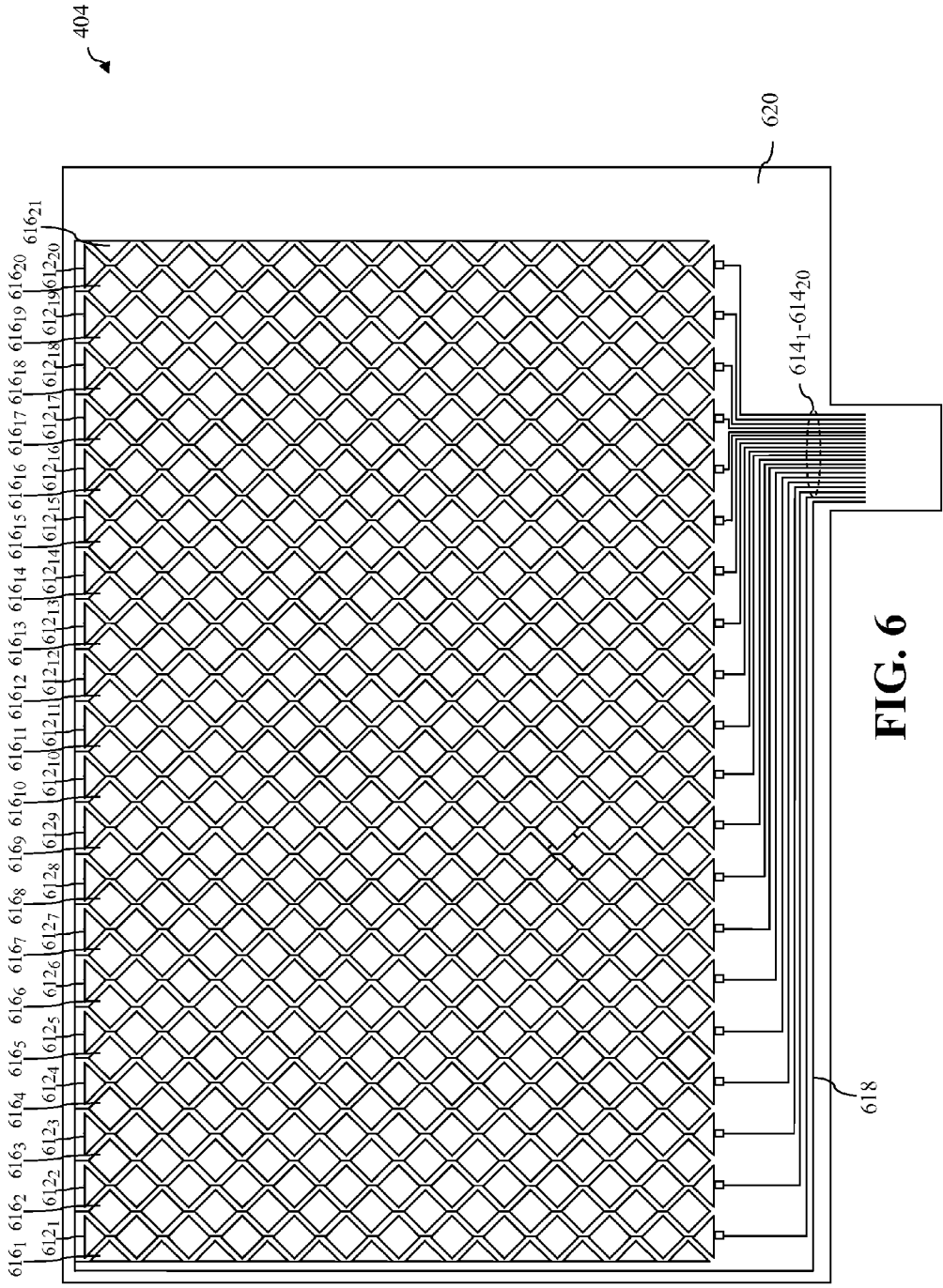
FIG. 6 is a top view of a second sensor layer of a touch-sensitive panel in accordance with an embodiment of the present invention.

A top view of one implementation of first sensor layer 402 is shown in FIG. 5 and a top view of a corresponding implementation of second sensor layer 404 is shown in FIG. 6. Each of these implementations will now be described. It is noted that these implementations have been provided by way of example only and are not intended to limit the present invention.

As shown in FIG. 5, first sensor layer 402 includes a series of substantially parallel sense electrodes $512_1$-$512_{12}$ that are disposed on and extend in a unidirectional manner across a surface of a substrate 520. Each of sense electrodes $512_1$-$512_{12}$ comprises a series of substantially diamond-shaped segments connected by smaller substantially rectangular-shaped segments, with partial substantially diamond-shaped segments connected to each longitudinal end. Sense electrodes $512_1$-$512_{12}$ are formed from an optically transparent resistive material such as indium tin oxide (ITO) or antimony tin oxide (ATO). Substrate 520 is also optically transparent and may comprise, for example, glass or a polyester film. In an embodiment in which substrate 520 comprises a polyester film, the polyester film may comprise, for example, a polyethylene terephthalate (PET) film.

Each of sense electrodes $512_1$-$512_{12}$ is connected to a corresponding conductive trace $514_1$-$514_{12}$ which is also disposed on the surface of substrate 520. Conductive traces $514_1$-$514_{12}$ may be formed from silver, copper, gold or other suitable conductive material. Conductive traces $514_1$-$514_{12}$ are used to couple sense electrodes $512_1$-$512_{12}$ to controller 308. Controller 308 charges each sense electrode $512_1$-$512_{12}$ via a corresponding conductive trace $514_1$-$514_{12}$, thereby causing an electrostatic field to be projected above each sense electrode. When a user presses an object, such as a finger or stylus, against top glass 302 or brings such an object within close proximity of top glass 302, the electrostatic field around one or more of sense electrodes $512_1$-$512_{12}$ is disturbed. The disturbance is sensed by controller 308 via the conductive trace(s) connected to the one or more sense electrodes and registered as a touch event.

Sense electrodes $512_1$-$512_{12}$ extend in a parallel manner across the surface of substrate 520 in a first direction. Consequently, by determining which of sense electrodes $512_1$-$512_{12}$ has registered a touch, controller 308 can determine the approximate location of the touch in a second direction that is substantially orthogonal to the first direction. The first direction will be arbitrarily referred to herein as the X direction and the second direction will be arbitrarily referred to herein as the Y direction.

As also shown in FIG. 5, first sensor layer 402 further includes a series of substantially parallel shield electrodes $516_1$-$516_{13}$ that are disposed on and extend in a unidirectional manner across the surface of substrate 520. Each of shield electrodes $516_1$-$516_{13}$ comprises a series of whole or partial substantially diamond-shaped segments connected by smaller substantially rectangular-shaped segments. Shield electrodes $516_1$-$516_{13}$ are formed from an optically transparent resistive material such as ITO or ATO and are preferably formed from the same optically transparent resistive material as sense electrodes $512_1$-$512_{12}$. Shield electrodes $516_1$-$516_{13}$ are formed in such a manner that the substantially diamond-shaped segments of shield electrodes $516_1$-$516_{13}$ are situated on substrate 520 in gaps that exist between the substantially diamond-shaped segments of sense electrodes $512_1$-$512_{12}$.

Each of shield electrodes $516_1$-$516_{13}$ is connected to a single conductive trace 518 which is also disposed on the surface of substrate 520. Conductive trace 518 is formed from silver, copper, gold or other suitable conductive material and is preferably formed from the same material as conductive traces $514_1$-$514_{12}$. Conductive trace 518 is used to couple shield electrodes $516_1$-$516_{13}$ to controller 308. Controller 308 applies a current to shield electrodes $516_1$-$516_{13}$ via conductive trace 518 in a manner that tends to cancel parasitic capacitance that might develop between overlapping sense electrodes on first sensor layer 202 and second sensor layer 204.

Shield electrodes $516_1$-$516_{13}$ extend across the surface of substrate 520 in a direction that is substantially parallel to sense electrodes $512_1$-$512_{12}$ and are approximately as long as sense electrodes $512_1$-$512_{12}$. Consequently, a first end of each of sense electrodes $512_1$-$512_{12}$ and shield electrodes $516_1$-$516_{13}$ is disposed on a first side of the surface of substrate 520 (shown as the left side of substrate 520 in FIG. 5) while a second end of each of sense electrodes $512_1$-$512_{12}$ and shield electrodes $516_1$-$516_{13}$ is disposed on a second side of the surface of substrate 520 (shown as the right side of substrate 520 in FIG. 5). As shown in FIG. 5, conductive trace 518 is connected to the first ends of shield electrodes $516_1$-$516_{13}$ while conductive traces $514_1$-$514_{12}$ are connected to the second ends of sense electrodes $512_1$-$512_{12}$. This layout is advantageous because parasitic capacitance tends to increase along each sense electrode $512_1$-$512_{12}$ as the distance from the corresponding conductive trace $514_1$-$514_{12}$ increases. Conversely, the extent to which each shield electrode $516_1$-$516_{13}$ is capable of negating parasitic capacitance tends to decrease as the distance from conductive trace 518 increases. Thus, by connecting the conductive traces to the sense electrodes $512_1$-$512_{12}$ and shield electrodes $516_1$-$516_{13}$ in this fashion, the portions of shield electrodes $516_1$-$516_{13}$ that tend to be most effective at negating parasitic capacitance are proximally located to the portions of sense electrodes $512_1$-$512_{12}$ at which parasitic capacitance tends to be the worst.

In one implementation, sense electrodes $512_1$-$512_{12}$ and shield electrodes $516_1$-$516_{13}$ are formed by depositing a layer of ITO, ATO or other substantially transparent resistive material on the surface of substrate 520 via sputter coating or other suitable process and then by etching away gaps between sense electrodes $512_1$-$512_{12}$ and shield electrodes $516_1$-$516_{13}$. Conductive traces $514_1$-$514_{12}$ and 518 may be formed by depositing a band of metal on the surface of substrate 520 and then etching away portions of the band, by depositing a conductive ink on substrate 520 using a silk screening process, or by some other suitable process.

The example implementation of second sensor layer 404 depicted in FIG. 6 will now be described. As shown in FIG. 6, second sensor layer 404 includes a series of substantially parallel sense electrodes $612_1$-$612_{20}$ that are disposed on and extend in a unidirectional manner across a surface of a substrate 620. Each of sense electrodes $612_1$-$612_{20}$ comprises a series of substantially diamond-shaped segments connected by smaller substantially rectangular-shaped segments, with partial substantially diamond-shaped segments connected to each longitudinal end. Sense electrodes $612_1$-$612_{20}$ are formed from an optically transparent resistive material such as ITO or ATO. Substrate 620 is also optically transparent and may comprise, for example, glass or a polyester film such as a PET film.

Each of sense electrodes $612_1$-$612_{20}$ is connected to a corresponding conductive trace $614_1$-$614_{20}$ which is also disposed on the surface of substrate 620. Conductive traces $614_1$-$614_{20}$ may be formed from silver, copper, gold or other suitable conductive material. Conductive traces $614_1$-$614_{20}$ are used to couple sense electrodes $612_1$-$612_{20}$ to controller 308. Controller 308 charges each sense electrode $612_1$-$612_{20}$ via a corresponding conductive trace $614_1$-$614_{20}$, thereby causing an electrostatic field to be projected above each sense electrode. When a user presses an object, such as a finger or stylus, against top glass 302 or brings such an object within close proximity of top glass 302, the electrostatic field around one or more of sense electrodes $612_1$-$612_{20}$ is disturbed. The disturbance is sensed by controller 308 via the conductive trace(s) connected to the one or more sense electrodes and registered as a touch event.

Sense electrodes $612_1$-$612_{20}$ extend in a parallel manner across the surface of substrate 620 in a second direction that is substantially orthogonal to the first direction in which sense electrodes $512_1$-$512_{12}$ extend across the surface of substrate 520. Consequently, by determining which of sense electrodes $612_1$-$612_{20}$ has registered a touch, controller 308 can determine the approximate location of the touch in the first direction. As noted above, the first direction will be arbitrarily referred to herein as the X direction and the second direction will be arbitrarily referred to herein as the Y direction.

As also shown in FIG. 6, second sensor layer 404 further includes a series of substantially parallel shield electrodes $616_1$-$616_{21}$ that are disposed on and extend in a unidirectional manner across the surface of substrate 620. Each of shield electrodes $616_1$-$616_{21}$ comprises a series of whole or partial substantially diamond-shaped segments connected by smaller substantially rectangular-shaped segments. Shield electrodes $616_1$-$616_{21}$ are formed from an optically transparent resistive material such as ITO or ATO and are preferably formed from the same optically transparent resistive material as sense electrodes $612_1$-$612_{20}$. Shield electrodes $616_1$-$616_{21}$ are formed in such a manner that the substantially diamond-shaped segments of shield electrodes $616_1$-$616_{21}$ are situated on substrate 620 in gaps that exist between the substantially diamond-shaped segments of sense electrodes $612_1$-$612_{20}$.

Each of shield electrodes $616_1$-$616_{21}$ is connected to a single conductive trace 618 which is also disposed on the surface of substrate 620. Conductive trace 618 is formed from silver, copper, gold or other suitable conductive material and is preferably formed from the same material as conductive traces $614_1$-$614_{20}$. Conductive trace 618 is used to couple shield electrodes $616_1$-$616_{21}$ to controller 308. Controller 308 applies a current to shield electrodes $616_1$-$616_{21}$ via conductive trace 618 in a manner that tends to cancel parasitic capacitance that might develop between overlapping sense electrodes on first sensor layer 202 and second sensor layer 204.

Shield electrodes $616_1$-$616_{21}$ extend across the surface of substrate 620 in a direction that is substantially parallel to sense electrodes $612_1$-$612_{20}$ and are approximately as long as sense electrodes $612_1$-$612_{20}$. Consequently, a first end of each of sense electrodes $612_1$-$612_{20}$ and shield electrodes $616_1$-$616_{21}$ is disposed on a first side of the surface of substrate 620 (shown as the top side of substrate 620 in FIG. 6) while a second end of each of sense electrodes $612_1$-$612_{20}$ and shield electrodes $616_1$-$616_{21}$ is disposed on a second side of the surface of substrate 620 (shown as the bottom side of substrate 620 in FIG. 6). As shown in FIG. 6, conductive trace 618 is connected to the first ends of shield electrodes $616_1$-$616_{21}$ while conductive traces $614_1$-$614_{20}$ are connected to the second ends of sense electrodes $612_1$-$612_{20}$. This layout is advantageous because parasitic capacitance tends to increase along each sense electrode $612_1$-$612_{20}$ as the distance from the corresponding conductive trace $614_1$-$614_{20}$ increases. Conversely, the extent to which each shield electrode $616_1$-$616_{21}$ is capable of negating parasitic capacitance tends to decrease as the distance from conductive trace 618 increases. Thus, by connecting the conductive traces to the sense electrodes $612_1$-$612_{20}$ and shield electrodes $616_1$-$616_{21}$ in this fashion, the portions of shield electrodes $616_1$-$616_{21}$ that tend to be most effective at negating parasitic capacitance are proximally located to the portions of sense electrodes $612_1$-$612_{20}$ at which parasitic capacitance tends to be the worst.

In one implementation, sense electrodes $612_1$-$612_{20}$ and shield electrodes $616_1$-$616_{21}$ are formed by depositing a layer of ITO, ATO or other substantially transparent resistive material on the surface of substrate 620 via sputter coating or other suitable process and then by selectively etching away gaps between sense electrodes $612_1$-$612_{20}$ and shield electrodes $616_1$-$616_{21}$. Conductive traces $614_1$-$614_{20}$ and conductive trace 618 may be formed by depositing a band of metal on the surface of substrate 620 and then selectively etching away portions of the band, by depositing a conductive ink on substrate 620 using a silk screening process, or by some other suitable process.

Depending upon the implementation, the gaps between the sense electrodes and shield electrodes on first sensor layer 402 and second sensor layer 404 may be of varying size. If the gaps are made sufficiently small (e.g., 0.07 mm in one embodiment), then internal reflections that might otherwise arise due to a difference between the refractive indices of the resistive material used to form sense electrodes on first sensor layer 402 and second sensor layer 404 and an adhesive layer that is used to join first sensor layer 402 to second sensor layer 404 can be reduced. As a result, a material such as non-index-matched indium tin oxide (ITO) may be used to implement the sense electrodes and shield electrodes on first sensor layer 402 and second sensor layer 404 while still maintaining an acceptable level of panel transparency. Such non-index-matched ITO can be less expensive and provide a lower resistance than index-matched ITO that is conventionally used to minimize internal reflections.

As noted above, an implementation of touch sensitive panel 304 is formed by disposing first sensor layer 402 on top of second layer 404 and affixing it thereto. During this process, first sensor 402 and second layer 404 are preferably aligned such that the overlap between the substantially diamond-shaped segments of sense electrodes $512_1$-$512_{12}$ of first sensor layer 402 and the substantially diamond-shaped segments of the sense electrodes $612_1$-$612_{20}$ of second sensor layer 404 is minimized. This arrangement helps to reduce capacitive coupling between the substantially diamond-shaped segments of the sense electrodes on the different sensor layers.

Figure 7:
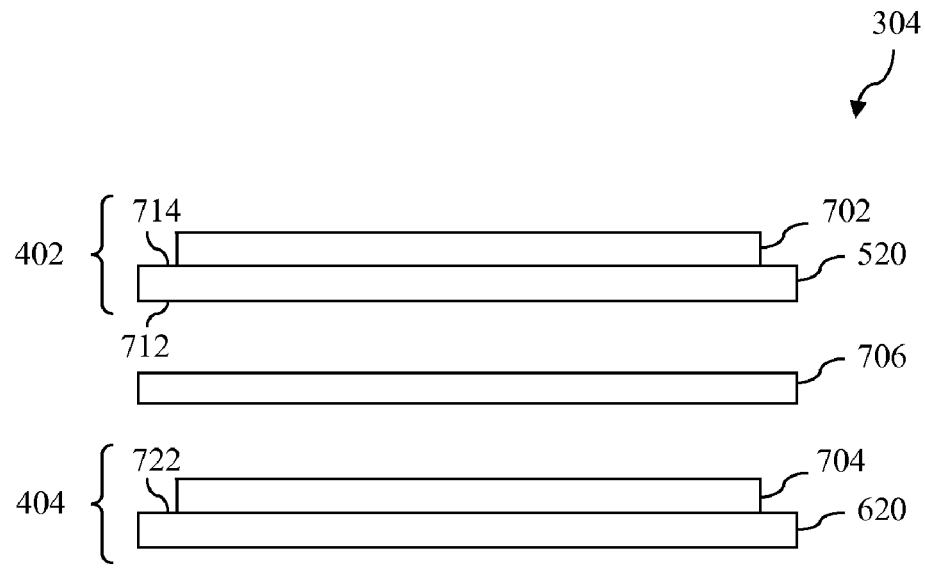
FIG. 7 is a side exploded view of a touch-sensitive panel in accordance with an embodiment of the present invention that includes a first sensor layer and second sensor layer that are formed using different substrates.

FIG. 7 is a side exploded view of an implementation of touch sensitive panel 304 that illustrates one manner by which first sensor layer 402 may be affixed on top of second layer 404. As shown in FIG. 7, a layer of substantially transparent adhesive layer 706 is disposed between a first surface 712 of substrate 520 and a first surface 722 of substrate 620 on which various elements 704 of second sensor layer 404 are formed. Adhesive layer 706 serves to bind first surface 712 to first surface 722 and elements 704. Elements 704 include sense electrodes $612_1$-$612_{20}$, shield electrodes $616_1$-$616_{21}$, and conductive traces $614_1$-$614_{20}$ and 618. Various elements 702 of first sensor layer 402 are formed on a second surface 714 of substrate 520 that is opposite to first surface 712 of substrate 520. Elements 702 include sense electrodes $512_1$-$512_{12}$, shield electrodes $516_1$-$516_{13}$, and conductive traces $514_1$-$514_{12}$ and 518.

Figure 8:
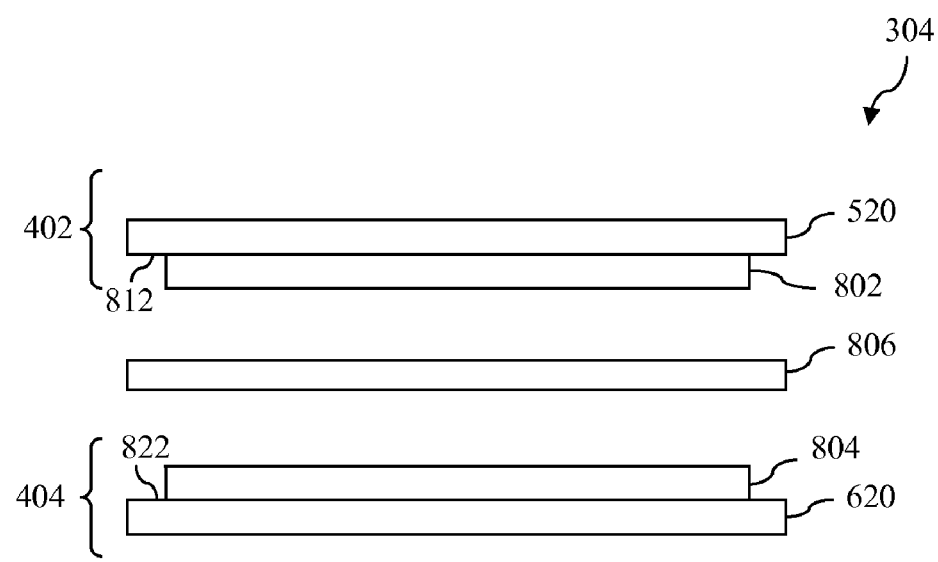
FIG. 8 is a side exploded view of an alternative touch-sensitive panel in accordance with an embodiment of the present invention that includes a first sensor layer and a second sensor layer that are formed using different substrates.

FIG. 8 is a side exploded view of another implementation of touch sensitive panel 304 that illustrates an alternative manner by which first sensor layer 402 may be affixed on top of second layer 404. As shown in FIG. 8, a layer of adhesive 806 is disposed between a first surface 812 of substrate 520 on which various elements 802 of first sensor layer 402 are formed and a first surface 822 of substrate 620 on which various elements 804 of second sensor layer 404 are formed. Adhesive layer 806 serves to bind first surface 812 and elements 802 to second surface 822 and elements 804 as well as to electrically isolate elements 802 and elements 804. Elements 802 include sense electrodes $512_1$-$512_{12}$, shield electrodes $516_1$-$516_{13}$, and conductive traces $514_1$-$514_{12}$ and 518. Elements 804 include sense electrodes $612_1$-$612_{20}$, shield electrodes $616_1$-$616_{21}$, and conductive traces $614_1$-$614_{20}$ and 618.

Figure 9:
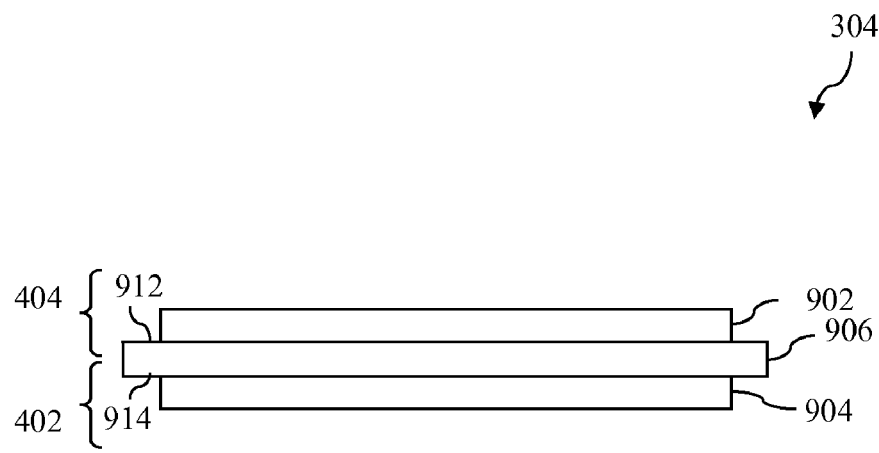
FIG. 9 is a side view of a touch-sensitive panel in accordance with an embodiment of the present invention in which a first sensor layer and a second sensor layer are formed on opposite sides of a single substrate.

FIG. 9 is a side view of another implementation of touch sensitive panel 304 that illustrates yet another manner by which first sensor layer 402 may be affixed on top of second layer 404. In the implementation shown in FIG. 9, first sensor layer 402 and second sensor layer 404 are formed on opposite sides of the same substrate 906. In particular, various elements 902 of first sensor layer 402 are formed on a first surface 912 of substrate 906 and various elements 904 of second sensor layer 404 are formed on a second surface 914 of substrate 906, wherein first surface 912 is on an opposite side of substrate 906 relative to second surface 914. Elements 902 include sense electrodes $512_1$-$512_{12}$, shield electrodes $516_1$-$516_{13}$, and conductive traces $514_1$-$514_{12}$ and 518. Elements 904 include sense electrodes $612_1$-$612_{20}$, shield electrodes $616_1$-$616_{21}$, and conductive traces $614_1$-$614_{20}$ and 618. Thus, although the description of first sensor layer 402 and second sensor layer 404 set forth above in relation to the example implementations of FIGS. 5 and 6 refers to surfaces of different substrates 520 and 620, it is to be understood that in one implementation the surfaces of substrates 520 and 620 may actually comprise opposing surfaces of the same substrate.

Figure 10:
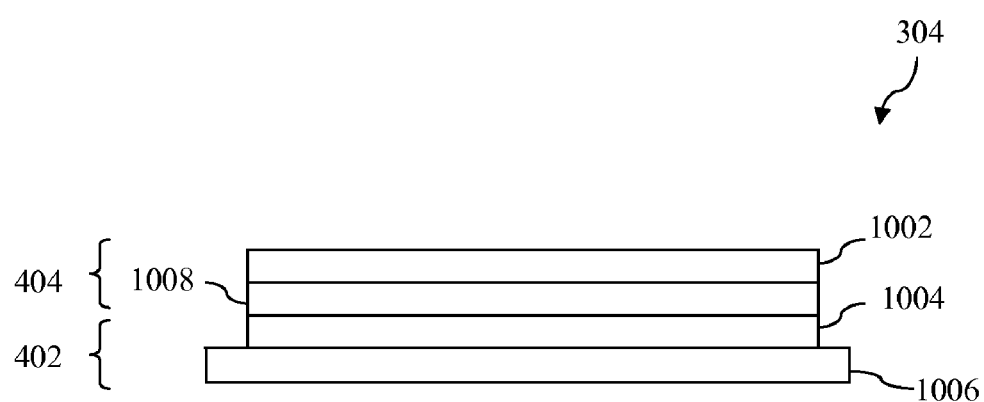
FIG. 10 is a side view of a touch-sensitive panel in accordance with an embodiment of the present invention in which a first sensor layer and a second sensor layer are formed on the same side of a single substrate.

FIG. 10 is a side view of another implementation of touch sensitive panel 304 that illustrates yet another manner by which first sensor layer 402 may be affixed on top of second layer 404. In the implementation shown in FIG. 10, second sensor layer 404 is formed on a substrate 1006. In particular, various elements 1004 of second sensor layer 404 are formed on a surface of substrate 1006. Elements 1004 include sense electrodes $612_1$-$612_{20}$, shield electrodes $616_1$-$616_{21}$, and conductive traces $614_1$-$614_{20}$ and 618. A dielectric layer 1008 is then formed on top of the surface of substrate 1006 and elements 1004. First sensor layer 402 is then formed on dielectric layer 1008. In particular, various elements 1002 of first sensor layer 402 are formed on a surface of dielectric layer 1008. Elements 1002 include sense electrodes $512_1$-$512_{12}$, shield electrodes $516_1$-$516_{13}$, and conductive traces $514_1$-$514_{12}$ and 518. Dielectric layer 1008 thus effectively serves as a substrate for elements 1002 and also serves to electrically isolate components 1002 and 1004.

Figure 11:
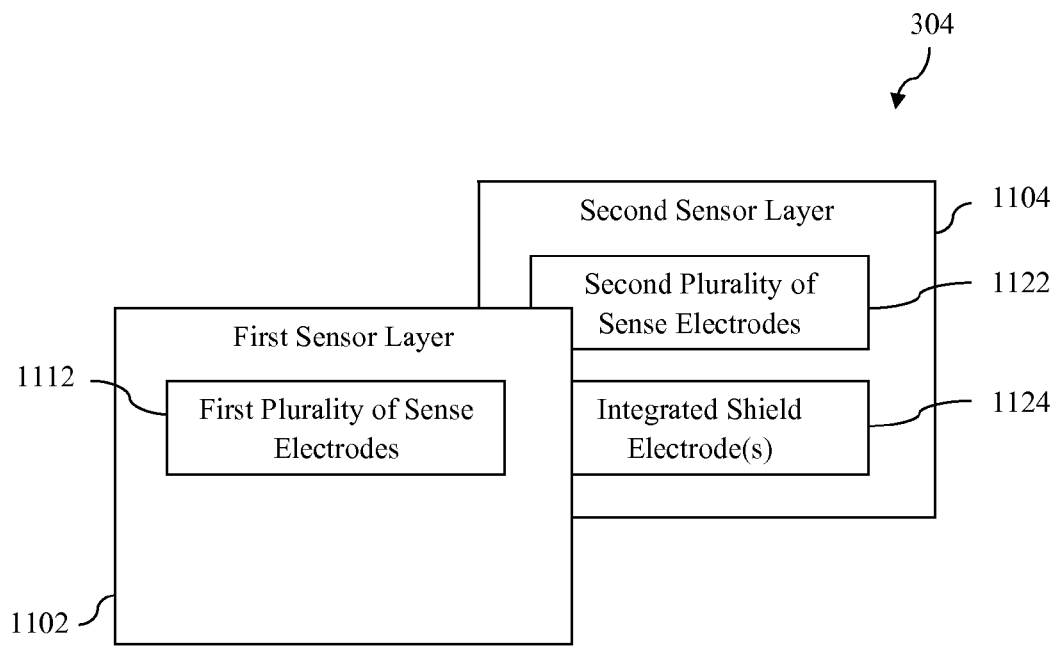
FIG. 11 is a block diagram of a touch-sensitive panel in accordance with an embodiment of the present invention that includes a first sensor layer disposed on top of a second sensor layer, wherein only the second sensor layer includes at least one shield electrode.

In the foregoing description of a touch-sensitive panel in accordance with an embodiment of the present invention, first sensor layer 402 and second sensor layer 404 each include at least one shield electrode for combating parasitic capacitance between sense electrodes disposed on first sensor layer 402 and sense electrodes disposed on second sensor layer 404. FIG. 11 is a block diagram of an alternate touch-sensitive panel in accordance with an embodiment of the present invention that includes a first sensor layer 1102 disposed on top of a second sensor layer 1104, wherein only second sensor layer 1104 includes at least one shield electrode. In particular, as shown in FIG. 11, first sensor layer 1102 includes a first plurality of sense electrodes 1112 operable to detect touch events in one direction. Second sensor layer 1104 includes a second plurality of sense electrodes 1122 operable to detect touch events in another direction and at least one shield electrode 1124. The at least one shield electrode included in second sensor layer 1104 is operable to cancel parasitic capacitance between at least one sense electrode in first sensor layer 1102 and at least one sense electrode in second sensor layer 1104.

For example, in one implementation of the embodiment shown in FIG. 11, first sensor layer 1102 is substantially similar to first sensor layer 402 depicted in FIG. 5, except that shield electrodes $516_1$-$516_{13}$ and conductive trace 518 are not formed on substrate 520. This could be achieved, for example, by fully etching away the regions of resistive material between sense electrodes $512_1$-$512_{12}$ rather than only partially etching those regions to create shield electrodes $516_1$-$516_{13}$. This could further be achieved by not depositing or printing conductive trace 518 or by etching away the conductive material that would otherwise have been used to create conductive trace 518. In further accordance with this example, second sensor layer 1104 may be substantially similar to second sensor layer 404 depicted in FIG. 6. One advantage of the foregoing arrangement is that it can be used to maximize exposure of sense electrodes 1122 within second sensor layer 1104 to the surface of touch-sensitive panel 304 by ensuring that there are no shield electrodes within first sensor layer 1102 that may overlap those sense electrodes.

Figure 12:
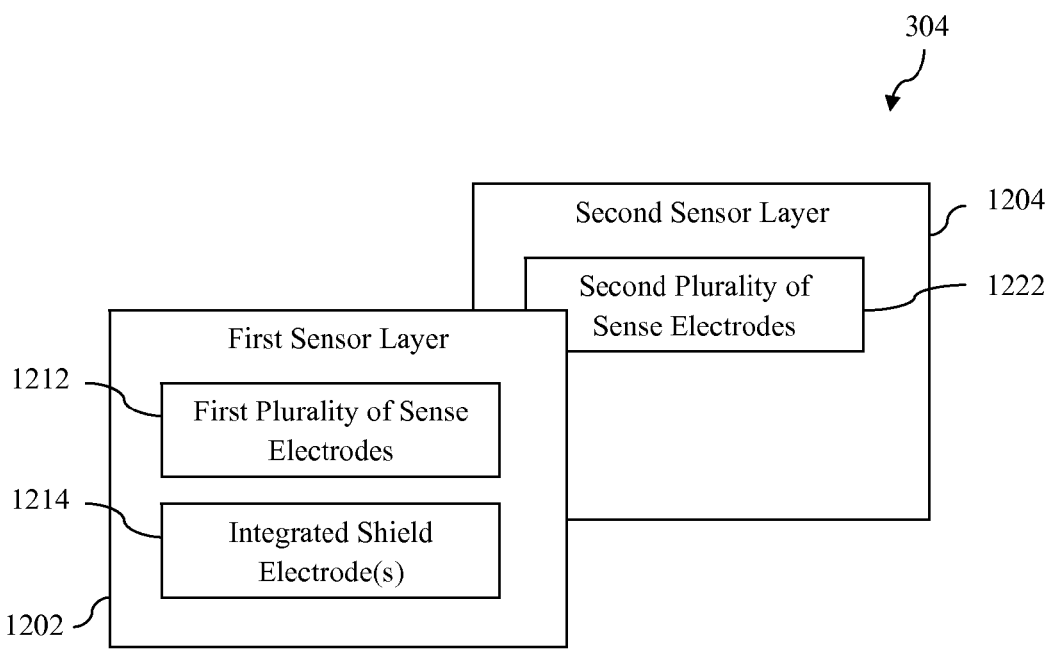
FIG. 12 is a block diagram of a touch-sensitive panel in accordance with an embodiment of the present invention that includes a first sensor layer disposed on top of a second sensor layer, wherein only the first sensor layer includes at least one shield electrode.

FIG. 12 is a block diagram of a further alternate touch-sensitive panel in accordance with an embodiment of the present invention that includes a first sensor layer 1202 disposed on a second sensor layer 1204, wherein only first sensor layer 1202 includes at least one shield electrode. In particular, as shown in FIG. 12, first sensor layer 1202 includes a first plurality of sense electrodes 1212 operable to detect touch events in one direction and at least one shield electrode 1214. Second sensor layer 1204 includes a second plurality of sense electrodes 1222 operable to detect touch events in another direction. The at least one shield electrode included in first sensor layer 1202 is operable to cancel parasitic capacitance between at least one sense electrode in first sensor layer 1202 and at least one sense electrode in second sensor layer 1204.

For example, in one implementation of the embodiment shown in FIG. 12, first sensor layer 1202 is substantially similar to first sensor layer 402 depicted in FIG. 5. In further accordance with this example, second sensor layer 1204 may be substantially similar to second sensor layer 404 depicted in FIG. 6, except that shield electrodes $616_1$-$616_{21}$ and conductive trace 618 are not formed on substrate 620. This could be achieved, for example, by fully etching away the regions of resistive material between sense electrodes $612_1$-$612_{20}$ rather than only partially etching those regions to create shield electrodes $616_1$-$616_{21}$. This could further be achieved by not depositing or printing conductive trace 618 or by etching away the conductive material that would otherwise have been used to create conductive trace 618.

Figure 13:
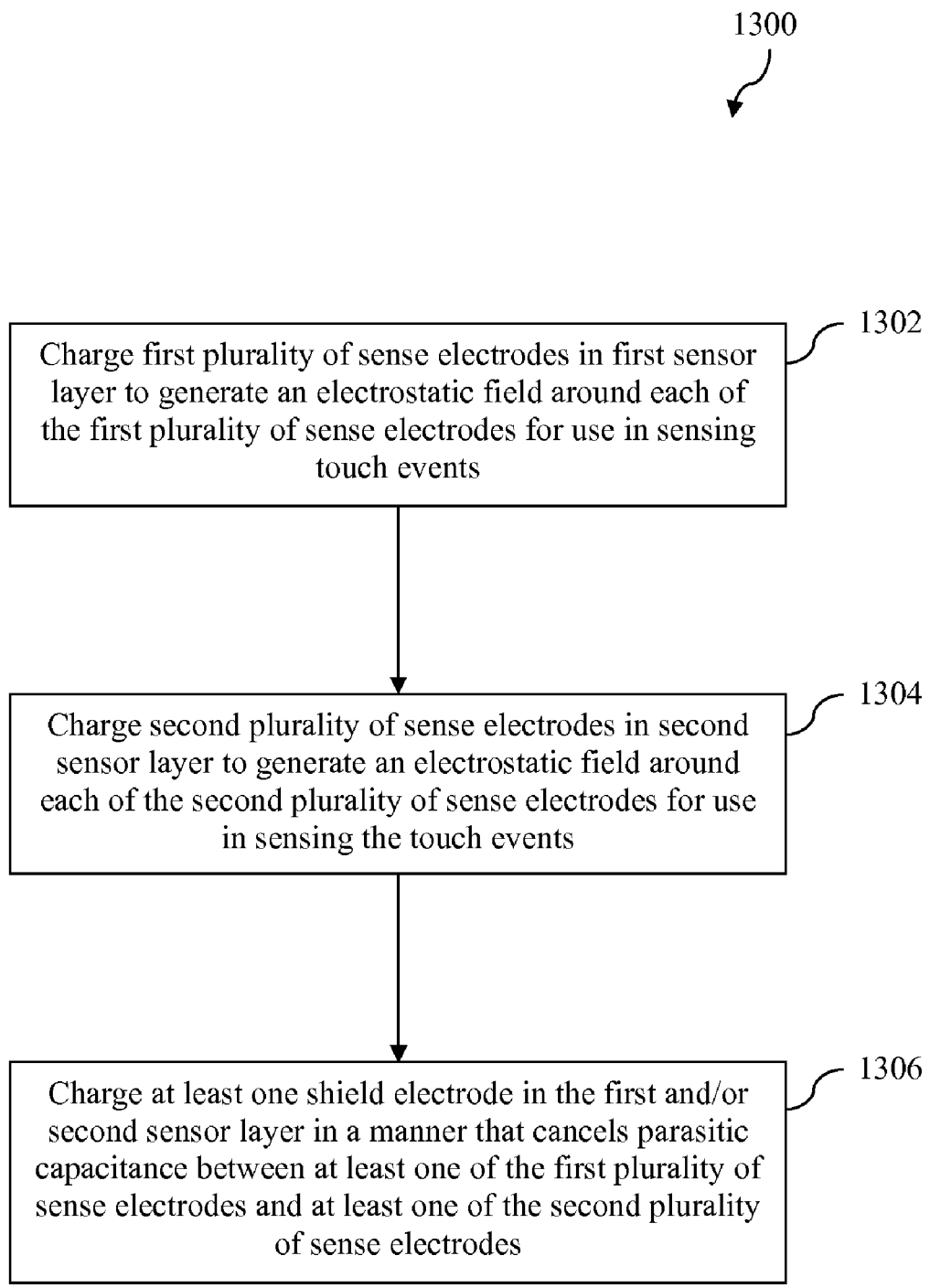
FIG. 13 depicts a flowchart of an example method for operating a touch-sensitive panel in accordance with an embodiment of the present invention.

D. Example Method of Operation of a Touch-Sensitive Panel in Accordance with an Embodiment of the Present Invention FIG. 13 depicts a flowchart 1300 of a method for operating a touch-sensitive panel in accordance with an embodiment of the present invention. The method of flowchart 1300 may be implemented, for example, by controller 308 of system 300 to operate the various embodiments of touch-sensitive panel 304 as previously described in reference to FIGS. 4-12. However, the method is not limited to those embodiments.

As shown in FIG. 13, the method of flowchart 1300 begins at step 1302 in which a first plurality of sense electrodes in a first sensor layer are charged to generate an electrostatic field around each of the first plurality of sense electrodes for use in sensing touch events. For example, with continued reference to one previously-described embodiment, controller 308 of system 300 may charge first plurality of sense electrodes 412 in first sensor layer 402 of touch-sensitive panel 304 to generate an electrostatic field around each of first plurality of sense electrodes 412 for use in sensing touch events. First plurality of sense electrodes 412 may be, for example, sense electrodes $512_1$-$512_{12}$ as described above in reference to FIG. 5.

At step 1304, a second plurality of sense electrodes in a second sensor layer are charged to generate an electrostatic field around each of the second plurality of sense electrodes for use in sensing the touch events. For example, with continued reference to one previously-described embodiment, controller 308 of system 300 may charge second plurality of sense electrodes 422 in second sensor layer 404 of touch-sensitive panel 304 to generate an electrostatic field around each of second plurality of sense electrodes 422 for use in sensing the touch events. Second plurality of sense electrodes 422 may be, for example, sense electrodes $612_1$-$612_{20}$ as described above in reference to FIG. 6.

At step 1306, at least one shield electrode in the first and/or second sensor layer is charged in a manner that cancels parasitic capacitance between at least one of the first plurality of sense electrodes and at least one of the second plurality of sense electrodes. For example, with continued reference to one previously-described embodiment, controller 308 of system 300 may charge at least one shield electrode 414 in first sensor layer 402 and/or at least one shield electrode 424 in second sensor layer 404 in a manner that cancels parasitic capacitance between at least one of first plurality of sense electrodes 412 and one of second plurality of sense electrodes 422.

E. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A touch-sensitive panel, comprising:
   a first sensor layer comprising a first plurality of sense electrodes that are disposed upon and extend in a first direction across a first substrate surface; and
   a second sensor layer comprising a second plurality of sense electrodes that are disposed upon and extend in a second direction across a second substrate surface and at least one shield electrode disposed on the second substrate surface;
   wherein each sense electrode is operable to generate an electrostatic field used in sensing touch events and wherein the at least one shield electrode is operable to cancel parasitic capacitance between at least one sense electrode in the first plurality of sense electrodes and at least one sense electrode in the second plurality of sense electrodes.

2. The touch-sensitive panel of claim 1, wherein the at least one shield electrode is disposed on the second substrate surface in a manner that reduces internal reflections.

3. The touch-sensitive panel of claim 1, wherein the second sensor layer comprises a plurality of shield electrodes disposed on the second substrate surface, each of the plurality of shield electrodes being disposed between and extending in a substantially parallel manner to a unique pair of the second plurality of sense electrodes.

4. The touch-sensitive panel of claim 3, wherein each of the second plurality of sense electrodes and the plurality of shield electrodes comprises a series of substantially diamond-shaped segments connected together by smaller substantially rectangular-shaped segments.

5. The touch-sensitive panel of claim 3, wherein each of the second plurality of sense electrodes and each of the plurality of shield electrodes has a first end that is disposed on a first side of the second substrate surface and a second end that is disposed on a second side of the second substrate surface and wherein the first end of each of the second plurality of sense electrodes is connected to a corresponding conductive trace operable to drive the sense electrode and wherein the second end of each of the plurality of shield electrodes is connected to a conductive trace operable to drive the shield electrode.

6. The touch-sensitive panel of claim 1, wherein the first sensor layer further comprises at least one shield electrode that is disposed on the first substrate surface and that is operable to cancel parasitic capacitance between at least one sense electrode in the first plurality of sense electrodes and at least one sense electrode in the second plurality of sense electrodes.

7. The touch-sensitive panel of claim 1, wherein the first substrate surface and the second substrate surface comprise surfaces of different substrates.

8. The touch-sensitive panel of claim 1, wherein the first substrate surface and the second substrate surface comprise opposite surfaces of a single substrate.

9. The touch-sensitive panel of claim 1, wherein the first direction is substantially orthogonal to the second direction.

10. The touch-sensitive panel of claim 1, wherein the first substrate surface and the second substrate surface each comprise a surface of a substantially transparent glass substrate.

11. The touch-sensitive panel of claim 1, wherein the first substrate surface and the second substrate surface each comprise a surface of a substantially transparent polyester film.

12. The touch-sensitive panel of claim 1, wherein the first plurality of sense electrodes, the second plurality of sense electrodes, and the at least one shield electrode are each formed from a substantially transparent resistive material.

13. The touch-sensitive panel of claim 12, wherein the substantially transparent resistive material comprises indium tin oxide (ITO).

14. The touch-sensitive panel of claim 13, wherein the ITO comprises non-index-matched ITO.

15. A touch-sensitive panel, comprising:
   a first plurality of sense electrodes that are formed from a first layer of substantially transparent resistive material and that extend in a first direction; and
   a second plurality of sense electrodes and at least one shield electrode that are formed from a second layer of substantially transparent resistive material and that extend in a second direction;
   wherein each sense electrode is operable to generate an electrostatic field used in sensing touch events and wherein the at least one shield electrode is operable to cancel parasitic capacitance between at least one sense electrode in the first plurality of sense electrodes and at least one sense electrode in the second plurality of sense electrodes.

16. A touch-screen display comprising:
   a touch-sensitive panel that includes a first sensor layer and a second sensor layer, the first sensor layer comprising a first plurality of sense electrodes that are disposed upon and extend in a first direction across a first substrate surface and the second sensor layer comprising a second plurality of sense electrodes that are disposed upon and extend in a second direction across a second substrate surface and at least one shield electrode disposed on the second substrate surface;

a controller connected to the first plurality of sense electrodes, the second plurality of sense electrodes and the at least one shield electrode, the controller being configured to charge the first and second plurality of sense electrodes to generate an electrostatic field around each sense electrode for use in sensing touch events and to charge the at least one shield electrode in a manner that cancels parasitic capacitance between at least one of the first plurality of sense electrodes and at least one of the second plurality of sense electrodes.

17. The touch-screen display of claim 16, wherein the at least one shield electrode is disposed on the second substrate surface in a manner that reduces internal reflections.

18. The touch-screen display of claim 16, wherein the second sensor layer comprises a plurality of shield electrodes disposed on the second substrate surface, each of the plurality of shield electrodes being disposed between and extending in a substantially parallel manner to a unique pair of the second plurality of sense electrodes.

19. The touch-screen display of claim 18, wherein each of the second plurality of sense electrodes and the plurality of shield electrodes comprises a series of substantially diamond-shaped segments connected together by smaller substantially rectangular-shaped segments.

20. The touch-screen display of claim 18, wherein each of the second plurality of sense electrodes and each of the plurality of shield electrodes has a first end that is disposed on a first side of the second substrate surface and a second end that is disposed on a second side of the second substrate surface and wherein the first end of each of the second plurality of sense electrodes is connected to the controller via a corresponding conductive trace and wherein the second end of each of the plurality of shield electrodes is connected to the controller via a conductive trace.

21. The touch-screen display of claim 16, wherein the first sensor layer further comprises at least one shield electrode that is disposed on the first substrate surface, wherein the controller is further connected to the at least one shield electrode disposed on the first substrate surface and is further configured to charge the at least one shield electrode disposed on the first substrate surface in a manner that cancels parasitic capacitance between at least one of the first plurality of sense electrodes and at least one of the second plurality of sense electrodes.

22. The touch-screen display of claim 16, wherein the first substrate surface and the second substrate surface comprise surfaces of different substrates.

23. The touch-screen display of claim 16, wherein the first substrate surface and the second substrate surface comprise opposite surfaces of a single substrate.

24. The touch-screen display of claim 16, wherein the first direction is substantially orthogonal to the second direction.

25. The touch-screen display of claim 16, wherein the first substrate surface and the second substrate surface each comprise a surface of a substantially transparent glass substrate.

26. The touch-screen display of claim 16, wherein the first substrate surface and the second substrate surface each comprise a surface of a substantially transparent polyester film.

27. The touch-screen display of claim 16, wherein the first plurality of sense electrodes, the second plurality of sense electrodes, and the at least one shield electrode are each formed from a substantially transparent resistive material.

28. The touch-screen display of claim 27, wherein the substantially transparent resistive material comprises indium tin oxide (ITO).

29. The touch-screen display of claim 28, wherein the ITO comprises non-index-matched ITO.

30. A method for operating a touch-sensitive panel comprising:

charging a first plurality of sense electrodes disposed upon and extending in a first direction across a first substrate surface to generate an electrostatic field around each of the first plurality of sense electrodes for use in sensing touch events;

charging a second plurality of sense electrodes disposed upon and extending in a second direction across a second substrate surface to generate an electrostatic field around each of the second plurality of sense electrodes for use in sensing the touch events; and charging at least one shield electrode disposed upon the second substrate surface in a manner that cancels parasitic capacitance between at least one of the first plurality of sense electrodes and at least one of the second plurality of sense electrodes.

31. A touch-screen display comprising:

a touch-sensitive panel that includes a first plurality of sense electrodes that are formed from a first layer of substantially transparent resistive material and that extend in a first direction and a second plurality of sense electrodes and at least one shield electrode that are formed from a second layer of substantially transparent resistive material and that extend in a second direction;

a controller connected to the first plurality of sense electrodes, the second plurality of sense electrodes and the at least one shield electrode, the controller being configured to charge the first and second plurality of sense electrodes to generate an electrostatic field around each sense electrode for use in sensing touch events and to charge the at least one shield electrode in a manner that cancels parasitic capacitance between at least one of the first plurality of sense electrodes and at least one of the second plurality of sense electrodes.

32. A method for operating a touch-sensitive panel comprising:

charging a first plurality of sense electrodes that are formed from a first layer of substantially transparent resistive material and that extend in a first direction to generate an electrostatic field around each of the first plurality of sense electrodes for use in sensing touch events;

charging a second plurality of sense electrodes that are formed from a second layer of substantially transparent resistive material and that extend in a second direction to generate an electrostatic field around each of the second plurality of sense electrodes for use in sensing the touch events; and charging at least one shield electrode formed from the second layer of substantially transparent resistive material in a manner that cancels parasitic capacitance between at least one of the first plurality of sense electrodes and at least one of the second plurality of sense electrodes.

* * * * *

UNITED STATES PATENT AND TRADEMARK OFFICE
CERTIFICATE OF CORRECTION

PATENT NO.         : 8,237,068 B2
APPLICATION NO.    : 12/537774
DATED              : August 7, 2012
INVENTOR(S)        : Daniel Szalkowski It is certified that error appears in the above-identified patent and that said Letters Patent is hereby corrected as shown below:

On Title page, in field (12) and (75), in "Inventor", in column 1, line 1, Delete "Szaikowski," and insert -- Szalkowski, --, therefor.

On Title page, in field (73), in "Assignee", in column 1, line 1, Delete "OpeanPeak" and insert --OpenPeak --, therefor.

Signed and Sealed this
Twenty-third Day of October, 2012

David J. Kappos
*Director of the United States Patent and Trademark Office*